United States Patent
Smyth

(10) Patent No.: US 9,261,768 B1
(45) Date of Patent: Feb. 16, 2016

(54) TROPHY CONTAINING PROJECTOR

(71) Applicant: International Awards Group, LLC, New Buffalo, MI (US)

(72) Inventor: James M. Smyth, New Buffalo, MI (US)

(*) Notice: Subject to any disclaimer, the term of this patent is extended or adjusted under 35 U.S.C. 154(b) by 0 days.

(21) Appl. No.: 14/571,741

(22) Filed: Dec. 16, 2014

(51) Int. Cl.
*G03B 29/00* (2006.01)
*G03B 21/14* (2006.01)
*A47G 33/00* (2006.01)

(52) U.S. Cl.
CPC .............. *G03B 29/00* (2013.01); *A47G 33/004* (2013.01); *G03B 21/145* (2013.01)

(58) Field of Classification Search
CPC .... A47G 33/004; G03B 29/00; G03B 21/145; G09F 19/00
See application file for complete search history.

(56) References Cited

U.S. PATENT DOCUMENTS

2007/0195294 A1* 8/2007 Willey .................. G03B 21/14
353/119

FOREIGN PATENT DOCUMENTS

| BR | 200815687 A2 | * | 11/2008 | ............... A44C 3/00 |
| CN | 2640565 Y | * | 9/2004 | ............. A63H 33/42 |
| CN | 201691562 U | * | 1/2011 | ............. A47G 19/22 |

* cited by examiner

*Primary Examiner* — Sultan Chowdhury
*Assistant Examiner* — Magda Cruz
(74) *Attorney, Agent, or Firm* — Dentons US LLP

(57) ABSTRACT

A body, preferably a trophy, containing a projector. The projector includes a front face at a base of the body, and a momentary switch that allows for automatic projection of an image when the trophy is lifted from a surface.

20 Claims, 9 Drawing Sheets

TROPHY CONTAINING PROJECTOR

The present disclosure generally relates to trophies and awards. The disclosure also relates to electronic projectors and their power circuits.

BACKGROUND

Trophies and awards come in many sizes and shapes, and are made of many different types of materials. Trophies and awards are given to recognize success in a variety of fields and endeavors. Some are highly specialized. Some are highly coveted.

In the advertising and marketing industry and the television, film and radio industry, International Awards Group owns and organizes international advertising and marketing competitions, as well as international television, film and radio program competitions. Entries into each are judged by professionals in their respective industries.

It is highly desirable to provide trophies and awards that are not only highly coveted for the recognition they provide, but also coveted because they are of high quality and innovative.

SUMMARY

The present disclosure provides a trophy or award in which is contained a projector. The projector is positioned to project an image, preferably a moving image, onto a surface when the trophy is lifted from the surface. The surface usually is a horizontal surface, relative to the earth, such as a table, desk or credenza, but could also be any other suitable surface, even a vertical surface.

In an embodiment, the trophy includes a solid body shaped to look like a building.

In an embodiment, the trophy includes a solid body shaped to look a art deco style skyscraper.

In an embodiment, the trophy includes a body with a cavity in a base thereof.

In an embodiment, the trophy includes a body with a cavity in a base thereof and a projector secured within the cavity.

In an embodiment, the projector includes power circuitry including a momentary switch that when allowed to switch to its normal state allows the projector to automatically project an image.

In an embodiment, the projector includes (a) a normally open switch that when closed signals the projector to assume a powered down state; (b) a housing with a front face facing outward from the cavity; and (c) an actuator for the normally open switch at the front face of the housing.

In an embodiment, the actuator for the normally open switch closes the normally open switch when the trophy base is placed against the surface and allows the normally open switch to open when the trophy base is lifted from the surface.

In and embodiment, there is provided an apparatus comprising:
 a body with a cavity; and
 a moving picture projector contained within the cavity, the projector having a front face flush with a bottom of the body, the projector having power circuitry with a momentary switch with an actuator that protrudes from the front face of the projector.

In an embodiment of the apparatus, the projector includes a projection lens located at the front face.

In an embodiment of the apparatus, the projector power circuitry includes a second changeover switch.

In an embodiment of the apparatus, the projector is configured to automatically project moving images when the bottom of the body is lifted from a surface.

In an embodiment of the apparatus, the body is shaped like a skyscraper having different sections at least two of which have different heights.

In an embodiment of the apparatus, the projector also includes an SD card reader, a changeover switch, a DC power receptacle, and a lens located at the front face of the projector.

In an embodiment, there is provided an electronic projector comprising:
 a housing,
 components in the housing used by the projector to effect projection of an image;
 a front face at one end of the housing;
 a lens located at the front face;
 power circuitry within the housing providing power voltages to the components; and
 a momentary switch, the momentary switch having a actuator that protrudes outwardly from the housing, the momentary switch switching a voltage within the power circuitry.

In an embodiment of the projector, the power circuitry includes a changeover switch for switching the voltage between the momentary switch and another circuit.

In an embodiment of the projector, the power circuitry includes a semiconductor switching element controlled by the momentary switch.

In an embodiment of the projector, the momentary switch is a normally open switch.

In an embodiment of the projector, the momentary switch is located at the front face.

In an embodiment of the projector, the projector comprises a changeover switch located at the front face, the changeover switch have an actuator accessible from outside of the housing.

In an embodiment of the projector, the projector comprises:
 a changeover switch located at the front face, the changeover switch have an actuator accessible from outside of the housing;
 an SD card reader located at the front face;
 a lens located at the front face; and
 a power input receptacle located at the front face.

In an embodiment of the projector:
 the changeover switch is connected within the power circuitry to switch a voltage between the momentary switch and another circuit,
 the power circuitry includes a semiconductor switching element, and
 the momentary switch is connected to enable a momentary connection between the voltage and a gate of the semiconductor switching element.

These and other features and aspects of the disclosure are described below in the detailed description with reference to the accompanying drawings.

DETAILED DESCRIPTION

Figure 1:
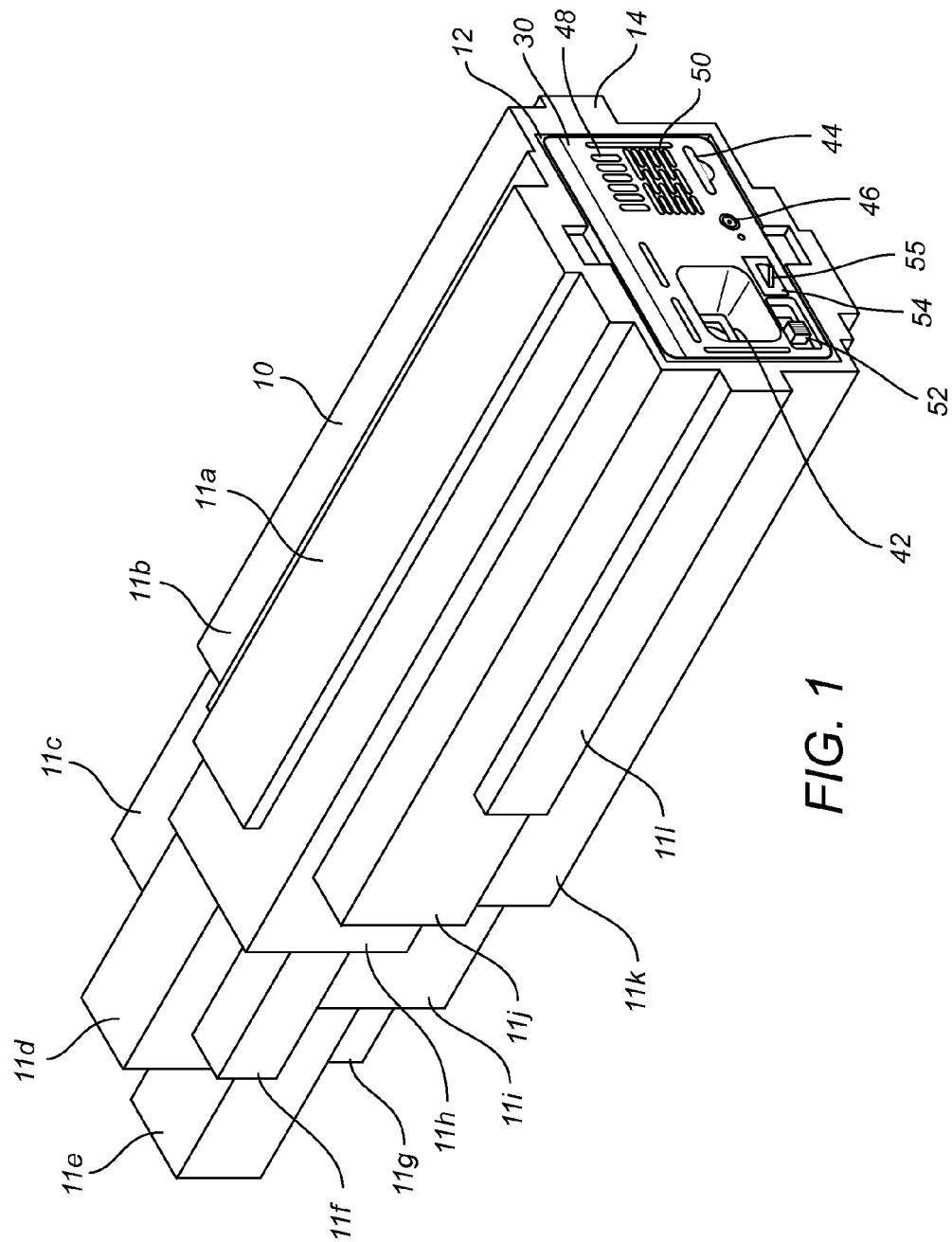
FIG. 1 illustrates in perspective view a trophy in which is contained a projector, with the trophy laying on its side with its base exposed.

The present disclosure is herein described in detail with reference to embodiments illustrated in the drawings, which form a part hereof. Other embodiment(s) may be used and/or other changes may be made without departing from the spirit or scope of the present disclosure. The illustrative embodiment(s) described in the detailed description is/are not meant to be limiting of the subject matter presented herein.

In FIG. 1 there is illustrated a trophy 10 which can embody principles disclosed herein. As can be seen, the trophy 10 is a representation of a building. In this case it is a building that resembles or evokes an art deco style skyscraper. That is to say, the trophy is shaped to appear like a building with various sections 11a to 111 of different heights bundled together. In cross section, the presence or absence of one of the sections will create different cross section shapes. Some cross sections might be square, some cross sections might be elongated rectangles, and some cross sections might be cross shaped, much like the Willis Tower in Chicago, Ill. In the claims, "different sections" refers to these sections of different heights. At least two sections of different heights will provide this effect, while, a number of sections of different heights will create greater cross-section variety.

The trophy 10 preferably has a solid body, except for a cavity 12 described later. The trophy 10 can be made of any suitable material. Preferably is it made of cast aluminum and powder-coated in a monochromatic color. Preferably the trophy 10 ranges in size from 8 to 14 inches (203 to 355 mm).

The trophy 10 can also be made of a moldable or shapeable material such as that a Corian® solid surface material or a Zodiaq® quartz surface material, both of which are provided by DuPont Corporation. Another material could be HI-MACS® acrylic solid surface material provided by G Hausys America, Inc.

Other materials will be obvious to those skilled in the art.

In FIG. 1, a base 14 of the trophy 10 can be seen. In the base 14, there is provided the cavity 12 in which is contained a projector 30. The cavity 12 can be any suitable size to accommodate the projector 30, not only due to its size, but also to provide suitable ventilation and secured retention of the projector 30. However, preferably, the cavity 12 is rectangular in shape and measures sufficiently slight larger than 60 mm wide by 40 mm high by 130 mm deep, to accommodate the 60 mm wide by 40 mm high by 130 long outer dimensions of a housing 31 of the projector 30. The cavity 12 must be deep enough so that a front face 40 of the projector 30 is flush with the base 14.

While one following the present disclosure can readily build a trophy to accommodate any sized projector, it is preferred that the projector 30 be what is commonly referred to as a pico-projector. Pico-projectors are very small projectors using a digital light processing (DLP) chipset provided by Texas Instruments, Inc.

Figure 2:
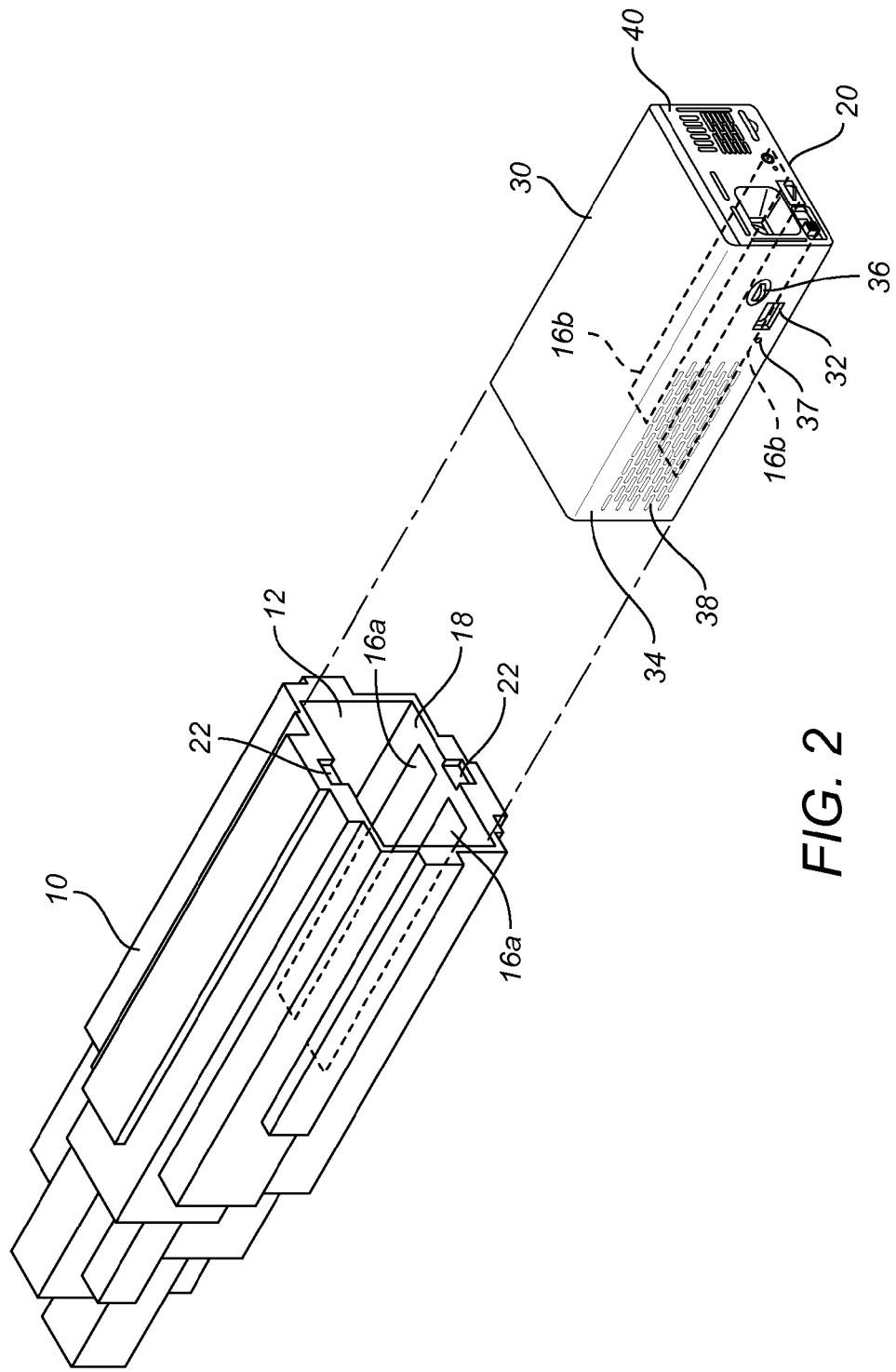
FIG. 2 illustrates in perspective view the trophy of FIG. 1 with the projector removed therefrom.

In FIG. 2, the projector 30 is illustrated removed from the cavity 12 of the trophy 10. With the projector 30 so removed, FIG. 2 illustrates a pair of hook and loop fastener strips used to secure the projector 30 within the cavity 12. In one embodiment, two hook or loop fastener strips 16a are arranged in parallel along one side 18 of the cavity 12. Preferably the side 18 is a side matching the 60 mm wide by 130 long bottom 20 of the projector 30. Similarly, the bottom 20 of the housing 31 of the projector 30 includes two parallel complementary loop or hook fastener strips 16b, so that when the projector 30 is inserted into the cavity 12, it is secured therein by the fastener strips 16a and 16b.

While other fastener means may be used, such hook and loop strips are readily available, even at retail stores. As is known, they are easily applied because one side includes an adhesive surface that is exposed by removing a quick release backing tape.

In another embodiment, the projector 30 can be secured within the cavity 12 by means of a magnetic arrangement. In one arrangement, where the housing 31 is ferrous, a thin magnet can be secured to a wall of the cavity 12. The magnetic will retained the projector 30 within the cavity by means of attracting the housing 31.

In another embodiment, two magnetic member can be used, one secured to a wall of the cavity 12, by, e.g., an adhesive, another secured to the housing 31, also by, e.g., an adhesive. The magnetic members can include magnets whose poles are aligned opposite each other to provide the necessary magnetic attraction. The magnetic member can be secured by a suitable adhesive. It can be appreciated that magnetics as thin as about 1/16th of an inch think and about 1/16th of an inch in diameter or diagonal could be suitable to retained the projector 30 in such a structure.

Also illustrated in FIG. 2 are two notches or rabbets 22 in the base 12. These notches facilitate the removal of the projector from the trophy 10. As can be appreciated, the notches 22 are sufficiently deep in both the height and depth directions of the cavity 12 to allow one's fingers or a gripping tool to more easily grasp opposite edges of the projector 30 so that it can be pulled out from the cavity 12.

The front face 40 of the projector 30 is described in detail below. However, in FIG. 2, it can be seen that the projector 30 includes a housing 31 with a universal serial (USB) port 32 on one side 34 thereof, as well as a focus wheel 36 and a pin hole 37 which gives access to a reset switch. The side 34 also includes ventilation grillwork or holes 38 via which ventilation air can be introduced into the projector 30. Similar or identical grillwork or holes are located on the non-illustrated opposite side of the housing 31.

Figure 3:
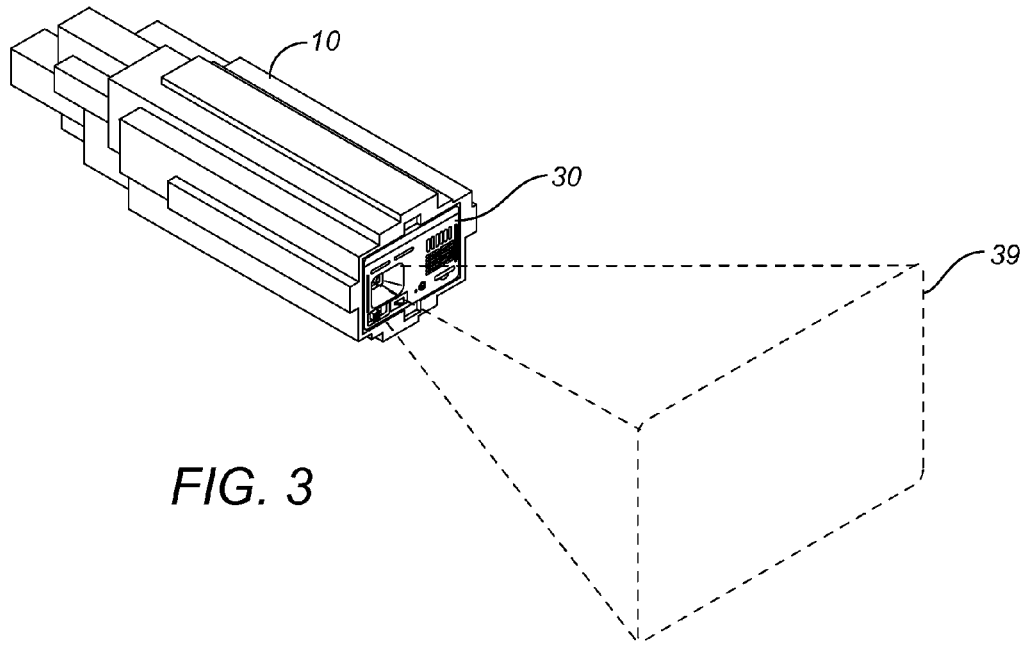
FIG. 3 illustrates in perspective view the trophy of FIG. 1 with the projector projecting an image therefrom.

In FIG. 3, it is shown how the projector 10 projects an image 39 such as a moving picture image. In a typical pico projector, the image 39 can be from several inches to several feet in diagonal dimension depending upon the distance of the projector 30 from the surface onto which the image 39 is projected. Preferably, the focus of the projector 30 is set to produce a clear image at a distance of about 18 inches. Of course, with autofocus capabilities, the projector can focus and over a large continuum of distances. Also, with autobiasing, a projector can produce a good rectangular image even though the image is in projected perpendicularly with respect to the surface.

Figure 4:
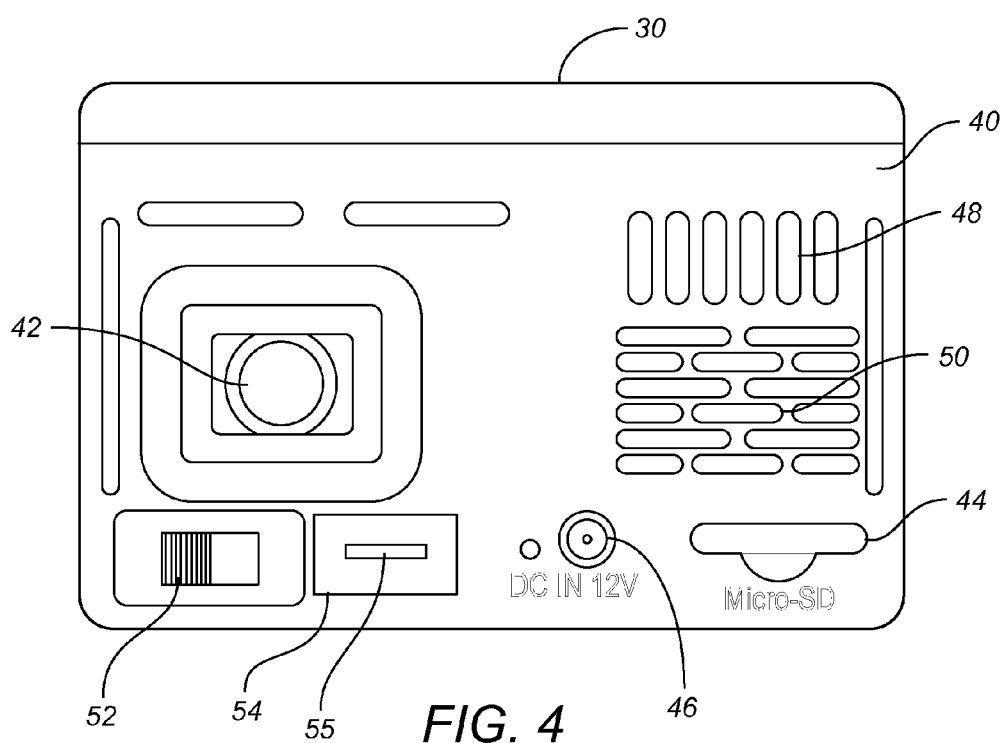
FIG. 4 illustrates a front face of the projector.

In FIGS. 1 and 4 there illustrated a front face 40 of the projector 30 which is contained within the trophy 10. In one embodiment, the front face 40 is rectangular and is 60 mm wide and 40 mm tall or high. This makes the projector very compact and not unduly large for the trophy 10.

As illustrated a lens 42 for the projector 30 is located at the front face 40 and it is from this lens 42 that images, preferably moving images, are projected out from the base 14 of the trophy. Preferably the lens is sufficiently recessed within the front face 40 so that when the trophy 10 is placed on a surface the lens does not contact the surface and risk being damaged, e.g. by scratching.

Also located at the front face 40 is memory card receptacle 44 within which can be received a suitable memory card. Preferably the memory card conforms to the Secure Digital Organization's SD format. The Secure Digital Organization maintains a website at www.sdcard.org. This format and its implementation are well known to designers of products and circuits utilizing SD card readers and receptacles.

The front face 40 includes a power receptacle 46 via which power can be input into the projector for charging purposes. Preferably the power receptacle 46 is selected to be a standard 12 volt DC power input. However, depending upon the specific DLP chip set used and the rechargeable battery system selected, other power receptacles might be used.

An air vent 48 is also included on the front face 40 of the projector 30. This vent 48 allows for direct ventilation of hot air from the projector 30 to the environment when the projector 30 is operational, which generally is when the base 14 is not against a surface, that is, the front face 40 is not against the surface.

A speaker is provided within the housing 31 and behind speaker grill section 50 on the front face 40.

The front face 40 also has located thereat a non-momentary manual power switch 52 whose actuator is movable between an "ON" position and an "OFF" position. The function of the switch 52 is described below. Although a variety of switches could be used as the switch 52, switch 52 preferably has a bistable sliding actuator.

Finally, located at the front face 40 of the projector 30 is a momentary switch 54. The momentary switch 54 includes a pivoting actuator or rocker 55. When the trophy 10 is placed on a surface, the rocker 55 is depressed into the front face 40 and causes switch 54 to make or break a circuit connection. Preferably, as described below, depressing of the rocker 55 causes switch 55 to make a circuit connection. When the trophy 10 is raised from the surface, the rocker 55 is allowed to pivot, due to a bias, and extend from the front face 40, and switch 54 is returned to its normal state, preferably an open state. This rocker 55 can be seen in perspective view in FIGS. 1 and 2.

Texas Instruments offers a variety of so-called pico projector chip sets for producing a variety of extremely small, high performance, lower power projectors. Such projectors can be embedded in in devices or used in extremely small hand held mobile projectors such as the Brookstone® Pocket Projector Mobile, 100 Lumens Model 801143p. This projector is battery powered and provides external connection to an input device such as a mobile phone and the insertion of a media containing SD memory card. http://www.ti.com/lsds/ti/analog/dlp/overview.page www.dlp.com In the present application, the projector 30 preferably uses a Texas Instruments DLP2607 digital controller. The DLPC2607 is a low-power DLP digital controller for battery-powered display applications. The controller performs the image processing and display control necessary to support the .VGA (video graphics array) WVGA (wide VGA), and nHD (one-ninth of full High Definition) display modes. These display modes are well known as are their resolutions and aspects. The DLPC2607 device can be used in systems where the projection display is embedded in a mobile device, as well as in accessory systems.

Texas Instruments provides a variety of tools and information for making a pico-projector including the DLPC2607 chipset. Item A in the Appendix hereto is a copy of a Texas Instruments data sheet and functional diagram for the DLPC2607, which is incorporated herein by reference. A functional schematic of the projector 30 utilizing the DLPC2607 is provided in FIG. 5.

Also provided in the Appendix as Item B is a copy of the DLPC2607 Graphical User Interface Guide. Item C in the Appendix is a copy of a DLPC2607 Software Programmer's Guide. Items B and C are incorporated herein by reference.

Figure 5:
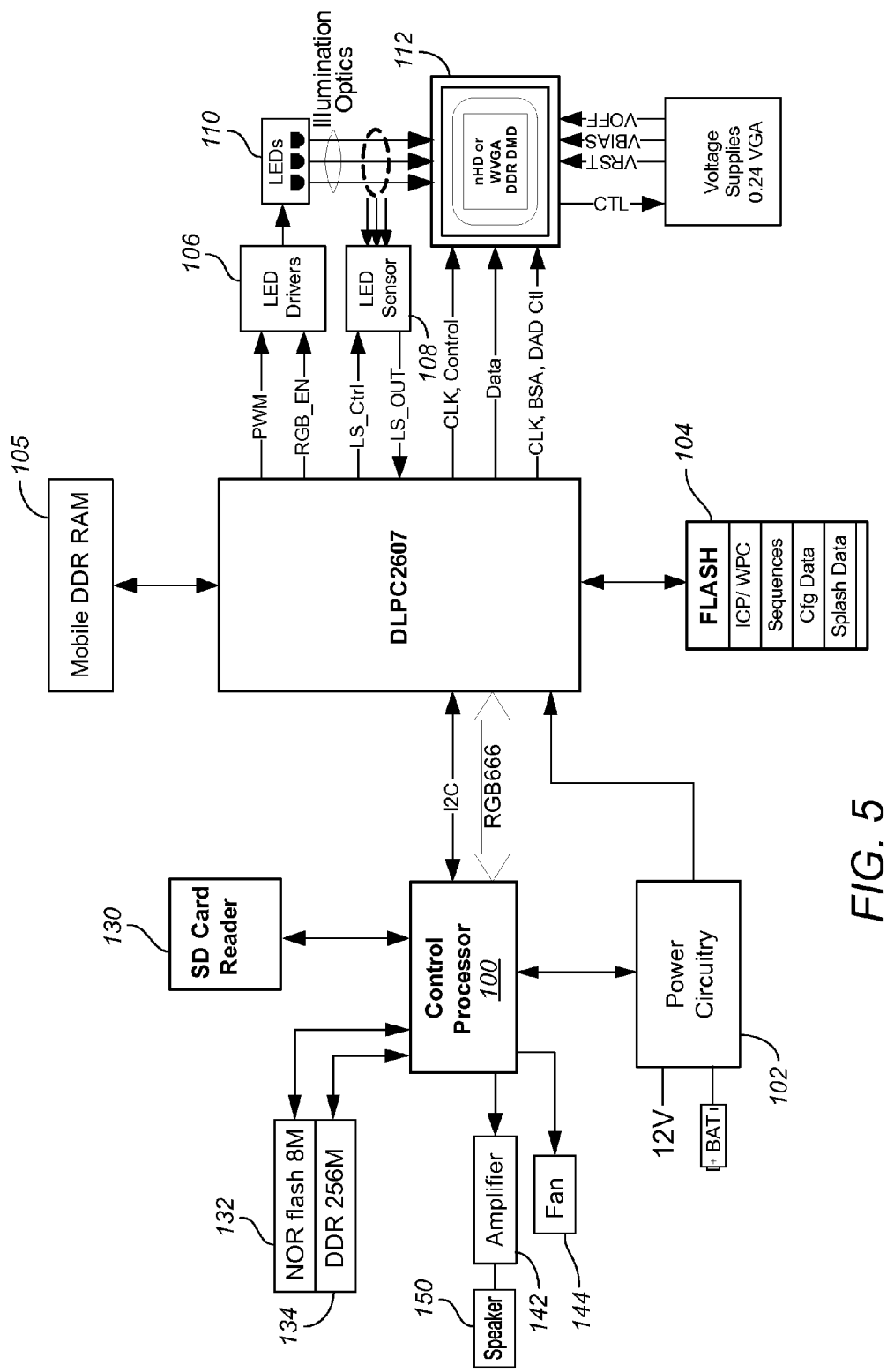
FIG. 5. Illustrates a block diagram of a circuit for the projector.

As illustrated in FIG. 5, the circuitry for the projector 30 includes the DLPC2607 to which are connected a control processor 100, power circuitry 102, flash memory 104, double date rate (DDR) random access memory 105, light emitting diode (LED) drivers 106, and LED sensor 108. LEDS 110, are connected to and driven by the LED drivers 106. The light output by the LEDs 110 is redirected by a digital micromirror device (DMD) 112 to produce the projected image 39. This is all standard configuration for use of a DLPC2067, as is evident from the data sheet provided as Item A, and well know to those of ordinary skill in design of pico projectors.

The power circuitry 102 receives as inputs the DC voltages from the 12V voltage source and a battery 122. As mentioned above, the power circuitry preferably has a receptacle 46 for a standard 12V DC adapter. Included in the power circuitry 102 is a charger circuit that preferably uses a switchmode single-cell/two-cell Li-ion/Li polymer battery charger, model HB2698A available from Huatai Electronics. The battery 122 preferably is a lithium ion battery sized to provide at least four hours of play time for the projector 30 and rated for an output of 6.5 to 8.4 volts. The power circuitry is discussed in greater detail below with reference to FIGS. 6, 7A-7D and 8.

The control processor 100 is utilized to control the operation of the DLPC2607 as is known to those of ordinary skill in this art. There are numerous projectors with such control processors. The selection is within the design choice of one of ordinary skill in the art. In one embodiment, the control processor 100 can be the C300 processor provided by Boxchip, a chipset manufacturer in China. The Boxchip C300 processor is available from Allwinner Technology Co., Ltd., Zhuhai, Guangdong province, China.

In FIG. 5, connected to the control processor are the power circuitry 102, an SD card reader 130, flash memory 132, (Double Data Rate) DDR memory 134, an audio amplifier 142, and a fan 144. A speaker 150 is connected to the audio amplifier 142. With the exception of the power circuitry 140, the various components and their connections are well known to those of ordinary skill in the art.

The SD card reader 130 is used to read in content files on SD cards inserted into the SD card receptacle 44. The files are received and processed by the controller 100, and the DLPC 2607 is controlled by the control processor 100 to project the images contained within the content. I2C and RCG666 communications connections between the control processor 100 and the DLPC2607 chipset are provided for that purpose.

The DDR memory 134 is provided as random access memory accessible by the control processor as it executes its processing software and as it processes the content retrieved from the SD card.

The flash memory 132 contains the operating system executed by the control processor 100.

The amplifier 142 is used to drive the speaker 150 under the control of the control processor 100 in the known way.

The fan 144 is used to ventilate the projector 300 and cool the control processor 100, the DLPC2607 and other heat generating components.

The power circuitry 102 is used to turn the projector 30 ON and OFF and to put the projector into a powered down state as described next in connection with FIGS. 6, 7A-7D and 8.

Figure 8:
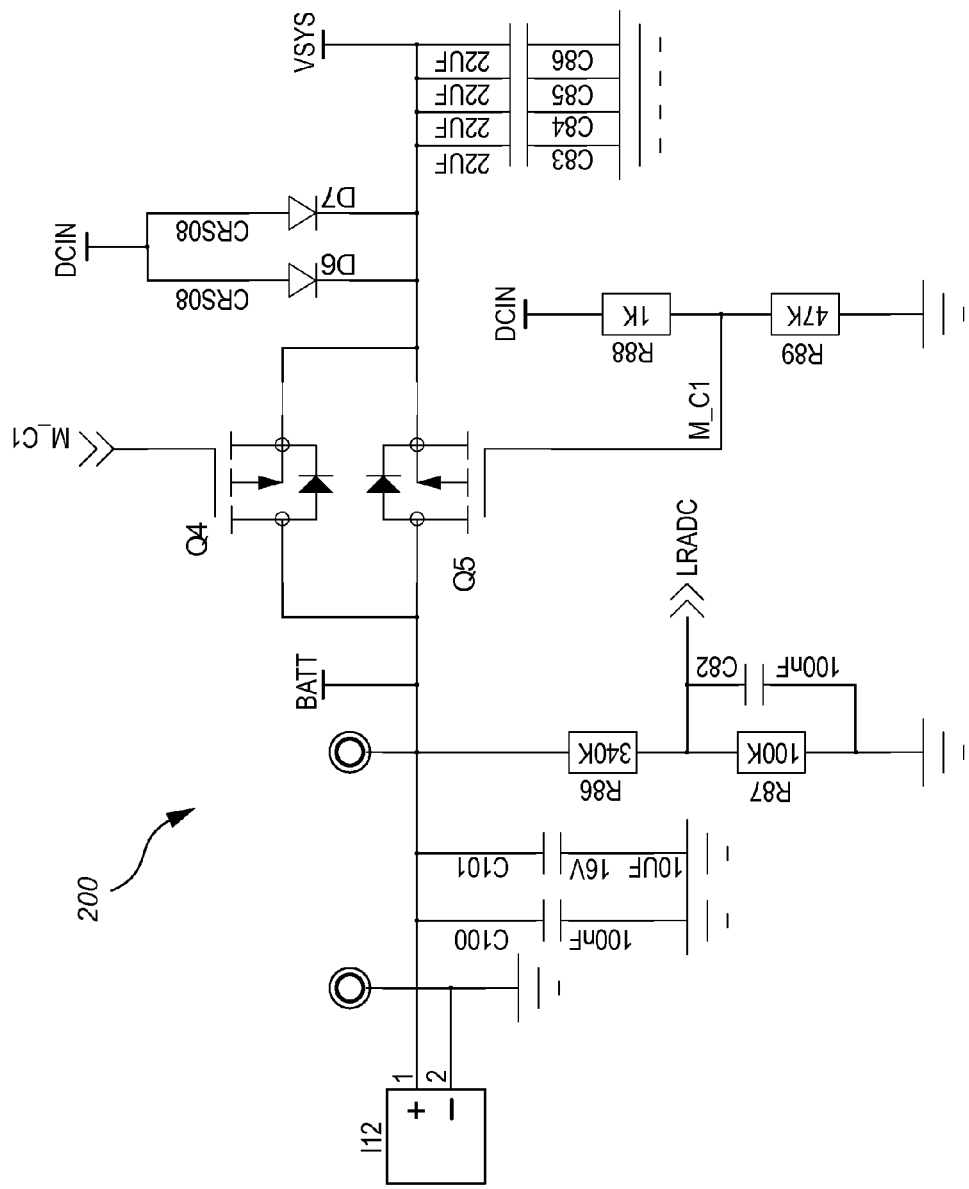
FIG. 8 illustrates a schematic for generating a system voltage VSYS.

In FIG. 8, there is shown a circuit 200 in which both the 12 v DC power source voltage and battery voltage are converted into a system voltage VSYS. A 12 v voltage derived from the 12 v DC power source is labeled DCIN. As can be appreciated, DCIN is derived after appropriate filtering of the incoming 12 v DC power. An input from a charger circuit (not illustrated) is labeled BATT.

As can be seen, depending upon whether the 12 v voltage source is connected this circuit will generate either VSYS equal to the battery voltage of 6.5-8.4 volts or the 12 v voltage of DCIN at the terminal labeled VSYS. This is because P-MOS transistors Q4 and Q5 act as switches that are placed into a non-conductive state when the signal DCIN is present.

Figure 6:
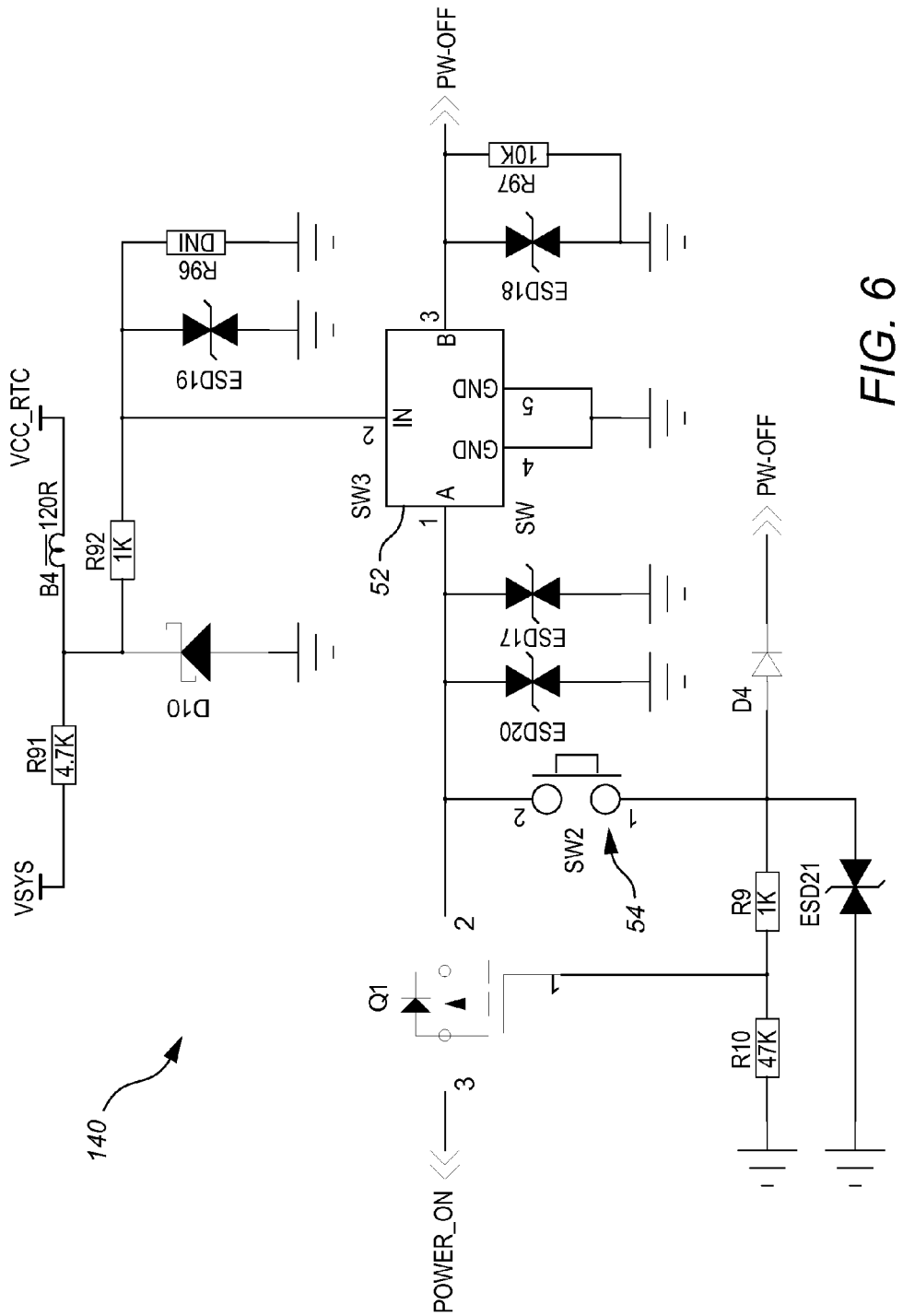
FIG. 6 illustrates a schematic for a power key module for the projector.

Referring to FIG. 6, the power circuitry 102 includes a Power On module 140 that itself includes the two switches 52 and 54 described previously. In FIG. 6, switch 54 is switch SW2 and switch 52 is switch SW3.

Switch SW2 is a normally open switch that can be momentarily closed. When closed, nodes 1 and 2 thereof are bridged or connected and the switch SW2 is in its "ON" state. Switch SW2 is also referred to herein as a rocker switch because preferably it has the biased pivoting actuator 55 that protrudes from the front face of the projector. When the projector front face 40 is placed against a surface, the actuator 55 is caused to retract into front face 40 of the housing 31 and in turn cause the switch SW2 to close and connect its nodes 1 and 2 and be placed in its ON state. Conversely, when the projector front face 40 is lifted or separated from the surface, the biased actuator 55 is allowed to pivot and extend from the front face 40 and in turn the switch SW2 is allowed to resume its normally open state in which nodes 1 and 2 are not connected and the switch SW2 is in its OFF state.

Other types of momentary normally open switches, such as straight push-button style switches, may also be used.

The switch SW3 preferably is a changeover switch that switches between an "ON" position in which its nodes 1 and 2 are bridged or connected and an "OFF" position in which nodes 1 and 2 are not connected but nodes 2 and 3 are bridged or connected. Suitable changeover switches can be single pole, triple throw or double pole, triple throw depending upon whether node 2 or nodes 1 and 3 are the center poles.

As can be seen, the system voltage VSYS is input into the module 140 and subject to a voltage division to produce a signal with a voltage of 3.3 volts. This 3.3 voltage is input into an input IN at a node 2 of the switch SW3.

When the manual switch SW3 is in its "OFF" position, the 3.3 v signal is directed to node 3 where it is output as a power off signal PW-OFF. The power off signal is received by the control processor 100 which reacts by placing the projector in a powered down state.

When the switch SW3 is in its "Off" position, no current flows to the switch SW3 node 1, and hence, no action of the switch SW2 is effective. That is, the state of the switch SW2 is irrelevant.

When the manual switch SW3 is switched to make a connection between nodes 1 and 2 the switch in the "ON" position. When the switch SW3 is in the ON position, a P-MOS transistor Q1 is connected to the 3.3 v signal. The P-MOS transistor Q1 in turn provides this signal to power conversion circuitry 200 described in connection with FIG. 7A as a signal labeled POWER ON. At this time, the use of all power is under the control of the control processor 100.

As described above, the rocker switch SW2 is biased to be normally open. That is the actuator 55 is biased to extend from the face 40 of the projector housing 31 and the connection between nodes 1 and 2 of the switch SW 2 is normally open.

However, when the switch SW2 actuator 55 is depressed and SW2 is closed, the 3.3V volts signal is directed through resistor R9 to the gate of the P-MOS transistor Q1 and the transistor is placed in a non-conductive state and no longer generates the POWER_ON signal. At this time the projector is placed in a powered down state. At the same time, the 3.3V volts signal is directed through diode D4 to trigger a shut-down signal to the controller F1C300 as PW-OFF to effect a projector shutdown.

When the switch SW2 is allowed to reopen, that is when the trophy 10 is lifted from the surface, the PW-OFF signal is stopped and the projector 30 automatically resumes its powered ON state and media content on the SD card is automatically caused to be projected.

Figure 7A:
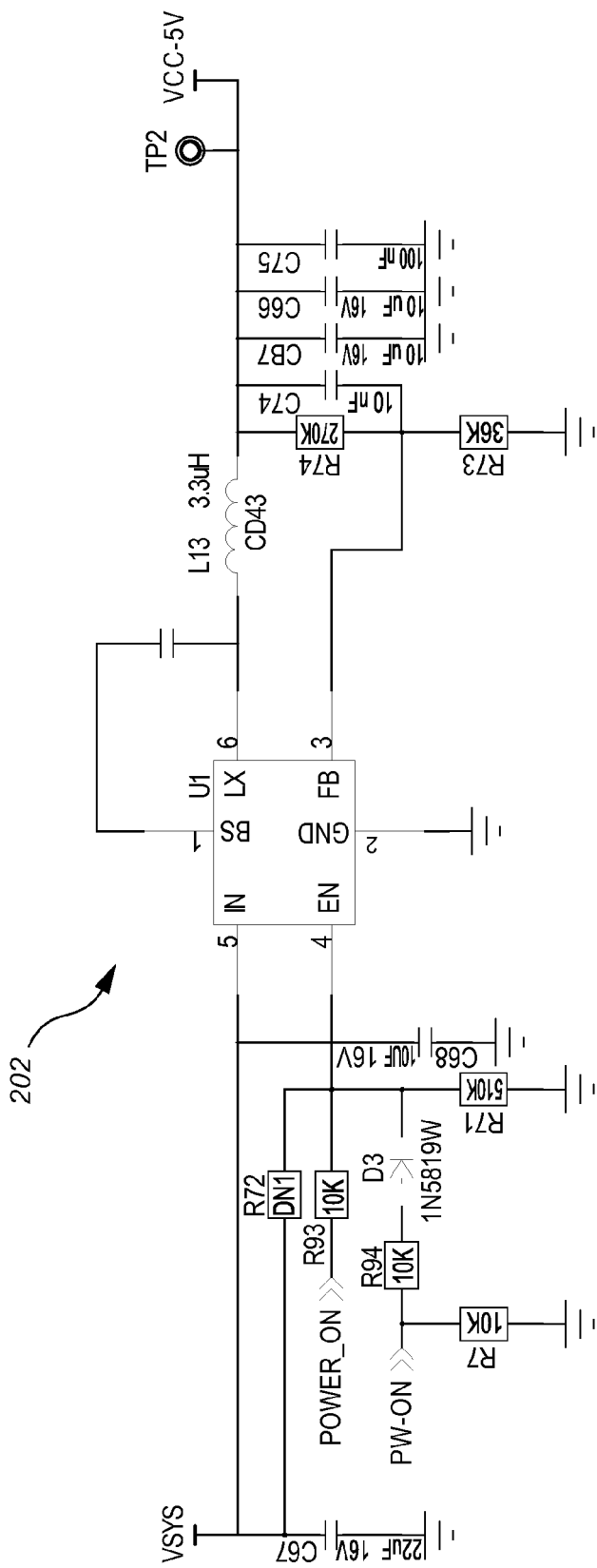
FIG. 7a illustrates a schematic for a power conversion module for a control processor for the projector.

In FIG. 7A, there is illustrated a schematic for the power conversion circuit 202 used to generate a 5 volt component voltage VCC-5V used to power various components such as, e.g. the DLPC2607 and the USB port among others. A DC-DC regulator U1 is used to convert the system voltage VSYS to the 5 v voltage VCC-5V. U1 preferably is a high efficiency 400 KHz synchronous step-down DC-DC regulator available from Silergy Corp. as model No. SY8133.

As also illustrated in FIG. 7A, the POWER ON signal generated by the Power On module 140 is used to turn on the regulator U1 because it is connected to the control enable input EN of the regulator U1. When on, the regulator U1 converts the VSYS voltage input at the voltage input IN to the voltage VCC-5V output following the inductor CD43.

Figure 7B:
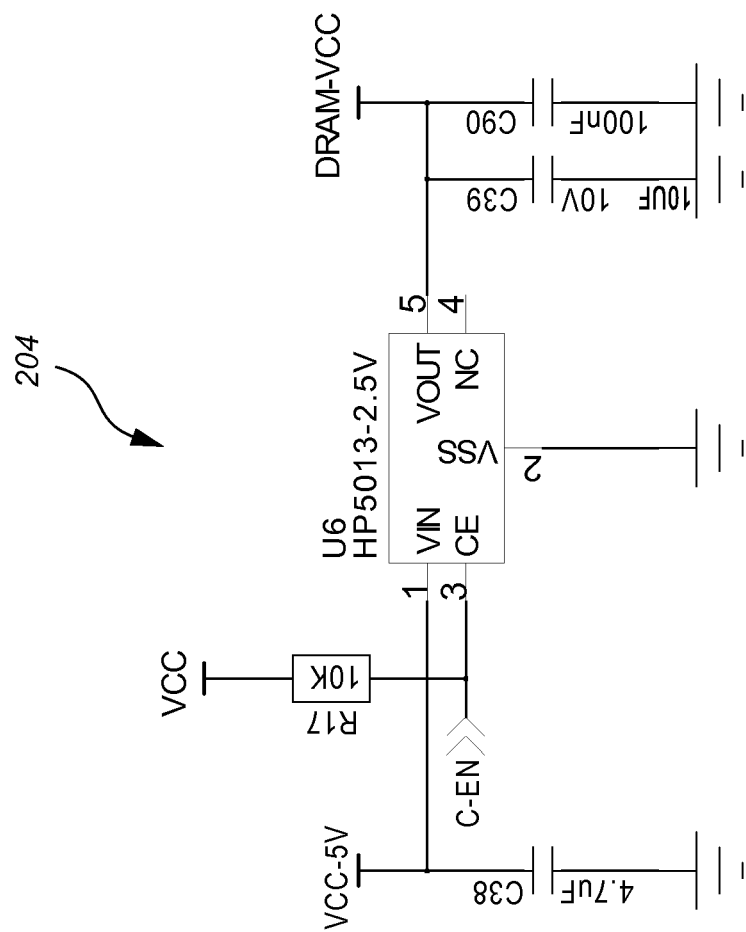
FIG. 7b illustrates schematic for controlling generation of a source voltage for circuits of the projector.

In FIG. 7B there is a circuit 204 used to generate a 2.5 v voltage DRAM-VCC used for powering DRAM memory components. As illustrated, the signal VCC-5V is used as an input voltage VN for a DC-DC regulator U6. An enable signal C-EN provided by the controller 100 is input into the enable input EN of the regulator U6 as is a 3.3 v voltage VCC. The presence of either voltage enables the regulator U6 to convert the voltage VCC-5V into the voltage DRAM-VCC.

Figure 7C:
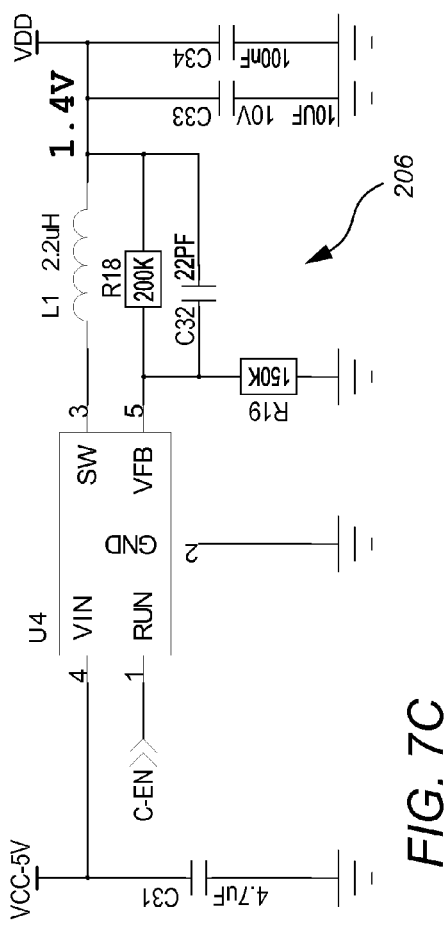
FIG. 7c illustrates a schematic for controlling generation of a memory source voltage for the projector.

In FIG. 7C, there is illustrated a circuit 206 used to generate a component 1.4 v voltage VDD from the 5 v voltage VCC-5V. As illustrated, the signal VCC-5V is used as an input voltage VN for a DC-DC regulator U4. The enable signal C-EN is input into the enable input of the regulator U4. When on, the regulator U4 converts the VCC-5V voltage input to the 1.4 v voltage VDD output following the inductor L1.

Figure 7D:
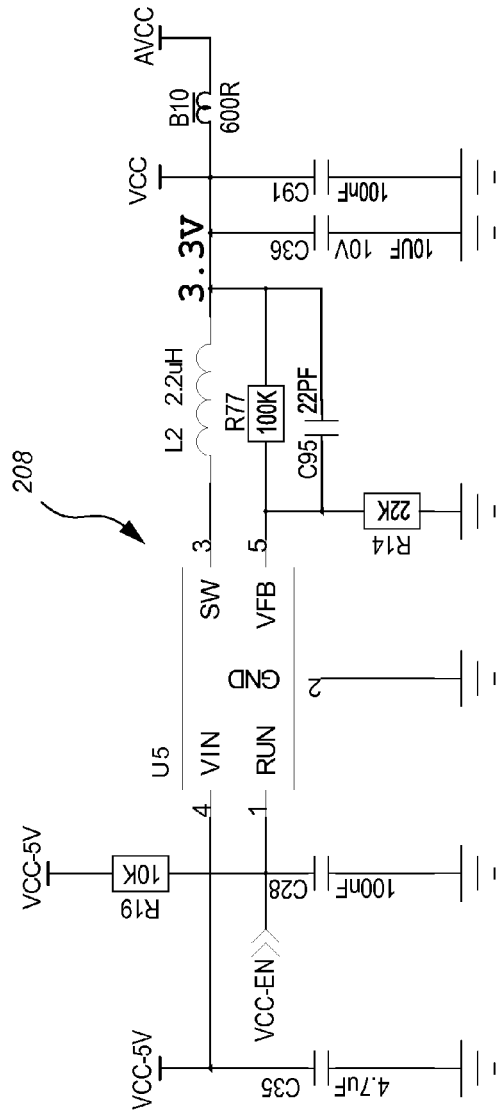
FIG. 7d illustrates a schematic for controlling generation of audio and visual source voltages for the projector.

In FIG. 7D, there is illustrated a circuit 208 used to generate component 3.3 v voltages VCC and AVCC from the 5 v voltage VCC-5V. As illustrated, the signal VCC-5V is used as an input voltage VN for a DC-DC converter U5. An enable signal VCC-EN generated by the controller 100 is input into the enable input RUN of the regulator U5. When on, the regulator U5 converts the VCC-5V voltage input to the 3.3 v voltage VCC output following the inductor L2 and the 3.3 voltage AVCC output following the iron core inductor B10.

Regulators U4 and U5 preferably are each a high-efficiency 1.5 MHz synchronous step-down DC-DC regulator provided by Silergy Corp. as Model No. SY8008.

As can be seen, although such a switch could easily be added, there is no switch that cuts off all power to the circuitry. That can only be accomplished by removal of the battery 122 and not plugging in the 12 v voltage source. Thus, assuming sufficient charging of the battery 122, with the switch 52/SW3 switched ON, when the trophy 10 is lifted from a surface, the projector 30 will automatically start up and play the files on the SD card in the SD card reader 130. When the trophy 10 is again placed in the surface, the projector will shut down.

As mentioned previously, the battery 122 preferably has the capacity to power the projector 30 for up to 4 hours. However, it is contemplated that the content placed on the SD card will be of relatively short duration, perhaps a minute or less. Thus, the trophy 10 can be operational, that is, repeatedly or sporadically, set on a surface yet play the content on the SD card when lifted for a relatively long period of time. Thus, a fully charged battery would enable a trophy configured as set forth above, to sit on a surface, e.g. a shelf or credenza, for weeks or months and still be ready for occasional lifting and use.

When the two switches 52/SW3 and 54/SW2 are in their ON positions, the projector is started and plays media files on the SD card in the order in which they are stored. The manner in which the files are played is standard in this design of such projectors. Each time the controller 100 is restarted, it begins again playing the files from the start of the first file. There is no special programming required to do this as this programming is known.

As for content, it is understood that just about any type playable content can be contained on the SD card. The content is only limited by the codecs programmed into the operating system of the control processor 100. However, it is preferred that in the context of a trophy given as an award for winning advertising work the content contain a copy of the winning work as well as identification information about the winner and/or the award. This additional information can be, e.g., in the form of scrolling graphics or text, like the credits in a movie. With such content, an SD card containing all of the winning work information, i.e., the desired content, can then be inserted into the SD reader 130 prior to awarding of the trophy. A recipient of the trophy need only turn on the manual power switch 52/SW3 located in the bottom of the trophy and set the trophy on a flat surface. When the trophy is lifted up off of the flat surface the switch 54/SW2 is actuated and power is supplied throughout the projector 30 as described above and the content automatically is projected onto any surface.

While the overall configuration of the projector 30, including the placement of the externally accessible components is novel, the components are available commercially. The configuration of the power on circuitry described above is also novel in a pico projector, although the individual components are available commercially.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A trophy in which is contained a projector, the projector positioned to project a moving image from a bottom of the trophy onto a surface only when the trophy is lifted from the surface, the projector having a momentary switch that changes state when the trophy is lifted form the surface.

2. The trophy of claim 1, wherein the trophy includes a solid body shaped to look like a building.

3. The trophy of claim 1, wherein the trophy includes a solid body shaped to look a art deco style skyscraper.

4. The trophy of claim 1, wherein, the trophy includes a body with a cavity in a base thereof.

5. The trophy of claim 1, wherein, the trophy includes a body with a cavity in a base thereof and the projector is secured within the cavity.

6. The trophy of claim 5, wherein, the projector includes:
power circuitry including a normally open switch as the momentary switch that when closed signals the projector to assume a powered down state;
a housing with a front face facing outward from the cavity; and
an actuator for the normally open switch at the front face of the housing.

7. The trophy of claim 6, wherein the actuator for the normally open switch closes the normally open switch when the trophy base is placed against the surface and allows the normally open switch to open when the trophy base is lifted from the surface.

8. An apparatus comprising:
a body with a cavity; and
a an electronic moving picture projector contained within the cavity, the projector having (a) a housing within the cavity, a front face of the housing flush with a bottom of the body, (b) components in the housing used by the projector to effect projection of a moving image (c) a lens located at the front face, (d) power circuitry in the housing, the power circuitry including a momentary switch that switches a voltage within the power circuitry and (e) an actuator for the momentary switch that protrudes from the front face of the projector.

9. The apparatus of claim 8, wherein the projector includes a projection lens located at the front face.

10. The apparatus of claim 9, wherein the projector power circuitry includes a second changeover switch.

11. The apparatus of claim 8, wherein the projector is configured to automatically project moving images when the bottom of the body is lifted from a surface.

12. The apparatus of claim 8, wherein the projector also includes an SD card reader, a changeover switch, a DC power receptacle, and a lens located at the front face of the projector.

13. An apparatus comprising:
a body with a cavity; and
an electronic moving image projector secured within the cavity, the projector having a front face flush with a bottom of the body, the projector having power circuitry with a momentary switch with an actuator that protrudes from the front face of the projector,
wherein,
the body is shaped like a skyscraper having different sections at least two of which have different heights.

14. An electronic moving image projector comprising:
a housing,
components in the housing used by the projector to effect projection of a moving image;
a front face at one end of the housing;
a lens located at the front face;
power circuitry within the housing providing power voltages to the components; and
a momentary switch, the momentary switch having a actuator that protrudes outwardly from the housing, the momentary switch switching a voltage within the power circuitry.

15. The projector of claim 14, wherein the momentary switch is located at the front face.

16. The projector of claim 14, wherein the power circuitry includes a changeover switch for switching the voltage between the momentary switch and another circuit.

17. The projector of claim 16, wherein the momentary switch is a normally open switch.

18. The projector of claim 14, further comprising a changeover switch located at the front face, the changeover switch having an actuator accessible from outside of the housing.

19. The projector of claim 14, further comprising:
   a changeover switch located at the front face, the changeover switch have an actuator accessible from outside of the housing;
   an SD card reader located at the front face; and
   a power input receptacle located at the front face.

20. The projector of claim 14, wherein the projector is a pico projector.

\* \* \* \* \*